(12) United States Patent
Creech (10) Patent No.: US 11,971,101 B2
(45) Date of Patent: *Apr. 30, 2024

(54) METHODS AND SYSTEMS FOR AN ACTUATION SYSTEM

(71) Applicant: Dana Automotive Systems Group, LLC, Maumee, OH (US)

(72) Inventor: Michael Z. Creech, Ann Arbor, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/657,077

(22) Filed: Mar. 29, 2022

(65) Prior Publication Data

US 2022/0221055 A1    Jul. 14, 2022

Related U.S. Application Data (63) Continuation of application No. 17/030,037, filed on Sep. 23, 2020, now Pat. No. 11,346,444.

(51) Int. Cl.
F16H 63/34 (2006.01)
(52) U.S. Cl.
CPC ..... F16H 63/3433 (2013.01); F16H 63/3466 (2013.01)
(58) Field of Classification Search
CPC ... F16H 63/34; F16H 63/3433; F16H 63/3466
See application file for complete search history.

(56) References Cited

U.S. PATENT DOCUMENTS

| | | | |
|---|---|---|---|
| 5,282,523 A | 2/1994 | Mueller et al. | |
| 5,704,457 A | 1/1998 | Kimura et al. | |
| 6,062,097 A | 5/2000 | Imao et al. | |
| 9,360,108 B2 | 6/2016 | Pfenninger et al. | |
| 2013/0256089 A1* | 10/2013 | Burgardt | B60T 1/005 192/219.5 |
| 2014/0060994 A1* | 3/2014 | Burgardt | F16H 63/18 192/219.6 |
| 2018/0154881 A1 | 6/2018 | Heubner et al. | |
| 2019/0136975 A1 | 5/2019 | Rodrigues et al. | |
| 2020/0166127 A1 | 5/2020 | Kwon et al. | |

FOREIGN PATENT DOCUMENTS

| | | | | |
|---|---|---|---|---|
| DE | 10105637 A1 * | 8/2002 | ......... | F16H 63/3416 |
| DE | 102014018469 A1 | 6/2016 | | |
| DE | 102018201432 A1 * | 8/2019 | ......... | F16H 63/3466 |
| EP | 0861995 A2 | 9/1998 | | |

* cited by examiner

Primary Examiner — Lori Wu
(74) Attorney, Agent, or Firm — McCoy Russell LLP (57) ABSTRACT

Methods and systems are provided for an actuation system for a parking mechanism in a transmission system of a vehicle. In one example, a system may include an actuator coupled to a lever arm via one or more parallel axis gears, and a shaft connecting the lever arm to a pawl of the parking mechanism, the lever arm non-back drivable at each of a first state and a second state of the actuation system.

18 Claims, 6 Drawing Sheets

METHODS AND SYSTEMS FOR AN ACTUATION SYSTEM

CROSS REFERENCE TO RELATED APPLICATION

The present application is a continuation of U.S. Non-Provisional patent application Ser. No. 17/030,037, entitled "METHODS AND SYSTEMS FOR AN ACTUATION SYSTEM", and filed on Sep. 23, 2020. The entire contents of the above-listed application are hereby incorporated by reference for all purposes.

TECHNICAL FIELD

The present description relates generally to methods and systems for a non-back drivable actuation system for a parking mechanism of a vehicle transmission system (or electric axle system).

BACKGROUND AND SUMMARY

Motorized vehicles may include a shift-by-wire system electrically coupling an automatic transmission of the vehicle to an instrument panel within a cabin of the vehicle. A user may interact with the instrument panel in order to select a gear mode of the transmission such as drive, park, neutral, etc. Upon the user selecting park as the desired transmission mode, a parking pawl may be actuated to engage a park gear of the transmission system and lock rotation of the park gear, thereby preventing the vehicle from moving. The park gear may be unlocked by disengaging the park gear from the park pawl.

Once the park gear is locked, the transmission system is desired to be held in the park mode until it is indicated by the user via the instrument panel to shift to a different gear mode. Also, upon disengagement and during vehicle travel, it is desired to maintain the park gear in the disengaged state. In the actuation system of the pawl, a very small rotational actuation of a lever may be desired to shift an output shaft of the actuator to an engaged/disengaged state (corresponding to an engaged/disengaged state of the pawl), along with a desired high rate of speed and accuracy. Once engaged/disengaged, the output shaft is desired to be non-back drivable to maintain the position of the pawl. Approaches for attaining the desired non-back drivable actuation mechanism for the pawl may include use of worm gears. However, the inventors herein have recognized potential issues with such systems. Use of worm gears that are non-back drivable exhibit an efficiency of lower than 50% which may result in significant loss of efficiency and costs. Further, systems involving extended use of a motor may increase power consumption and costs associated with the operation.

In one example, the issues described above may be addressed by an actuation system in a parking mechanism of a vehicle, comprising: an actuator coupled to a lever arm via one or more gears, and a shaft connecting the lever arm to a shifting member of the parking mechanism, the lever arm non-back drivable at each of a first state and a second state of the actuation system. In this way, by using a parallel axis gear train to actuate a pawl of a parking mechanism, a non-back drivable actuation system may be attained where a small movement of a motor may suffice to transition the parking mechanism from a disengaged position to an engaged position.

As one example, a parking mechanism of a vehicle transmission system may include a pawl that is selectively engaged to a parking gear upon selection of park (by a user) as the desired transmission system mode. The parking mechanism may be actuated between a first state where the pawl is engaged to the parking gear to inhibit further movement of the vehicle wheel and a second state where the pawl is disengaged from the parking gear allowing transmission system to rotate the wheels. An electronic actuation system may include a motor connected via a drive mechanism such as a parallel axis gear train, the drive mechanism including an output shaft coupled to a parallel axes gear system. The output shaft may be mounted on a lever arm and the lever arm may be mounted on a drive pin housed within a slot. The drive pin may be coupled to a final gear of the gear train to drive the lever arm, the drive pin being eccentric to the final gear to generate a cam effect. A locking pin may be coupled to the final gear to inhibit further motion of the lever arm upon reaching one of the first state and the second state and lock the parking mechanism in the desired engaged/disengaged state. The output shaft may be coupled to the pawl via a cam. In order to engage the pawl, the final gear may be rotated in a counterclockwise direction past a tangent point where the direction of travel of the drive pin is tangent to the axis of the lever until the lever is locked (first locked position) at the locking pin. In order to disengage the pawl, the final gear may be rotated in a clockwise direction past the tangent point until the lever is locked (second locked position) at the locking pin and corresponding rotation of the cam disengages the pawl from the parking gear. At the locked positions, the lever may not be back-drivable. In the first locked position, the output shaft of the lever arm may cause the cam to rotate and engage the pawl with the parking gear while in the second locked position the output shaft of the lever arm may cause the cam to rotate and disengage the pawl with the parking gear.

In this way, by including a drive pin eccentric to a final gear of a parallel axis gear train and a locking pin on the final gear, a lever coupled to the parallel axis gear train may be locked in one of two distinct positions. By locking the lever in one of a first and a second position, it is possible to maintain the pawl of the parking mechanism at a desired engaged or disengaged position. The technical effect of using the actuation system with the parallel axis is that due to the non-back drivable feature of the actuation system, when the park mode of the transmission system is selected, the wheels may not move and vehicle may not slide, and when the transmission mode is changed from park, the pawl may not be unintentionally engaged when the vehicle is being driven. Overall, the actuation system includes a simplified arrangement of components that may be used in a cost-effective manner for engagement and disengagement of the parking mechanism.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
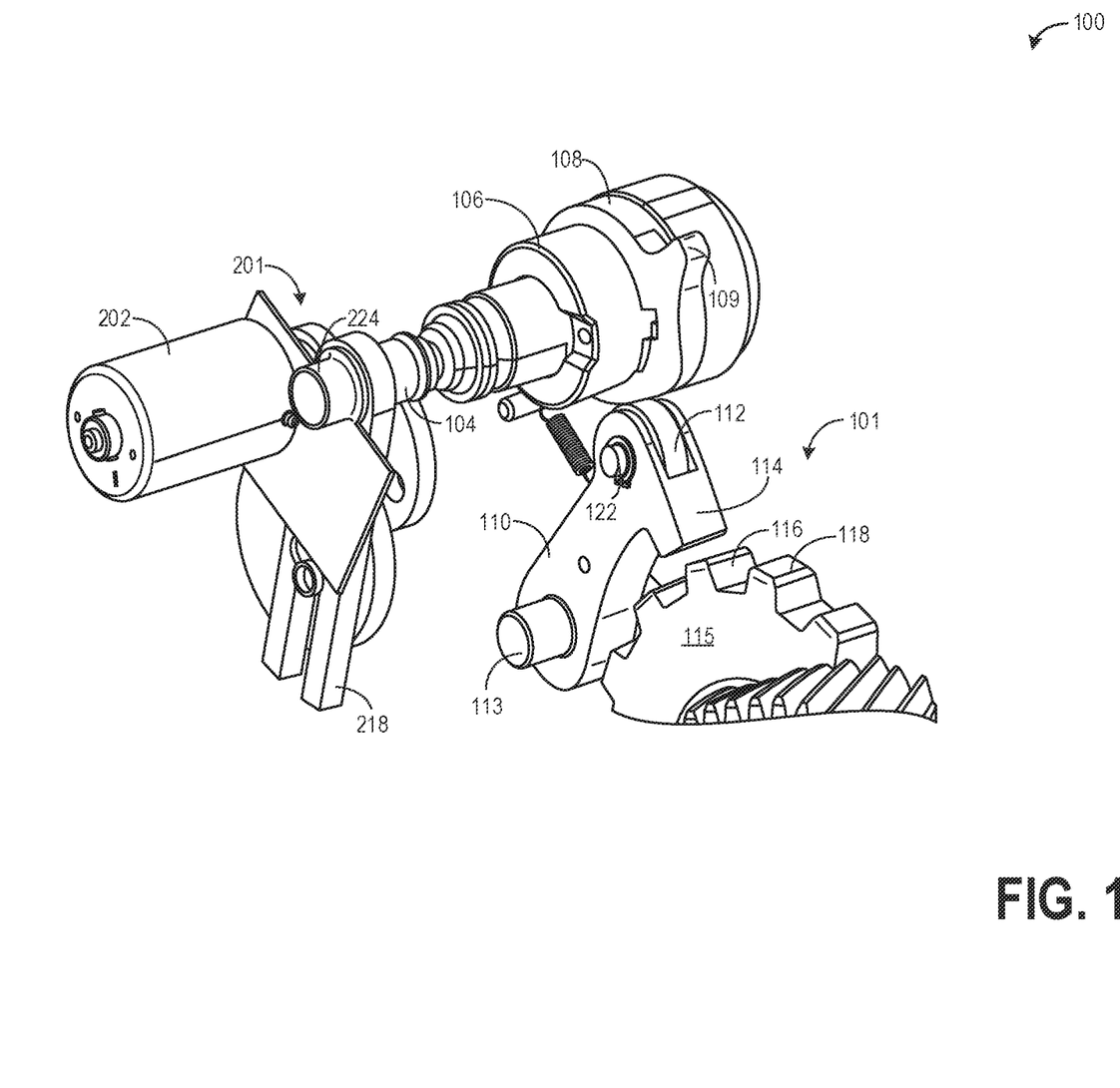
FIG. 1 shows an example parking mechanism of a transmission system including an electronic actuation system.
Figure 2A:
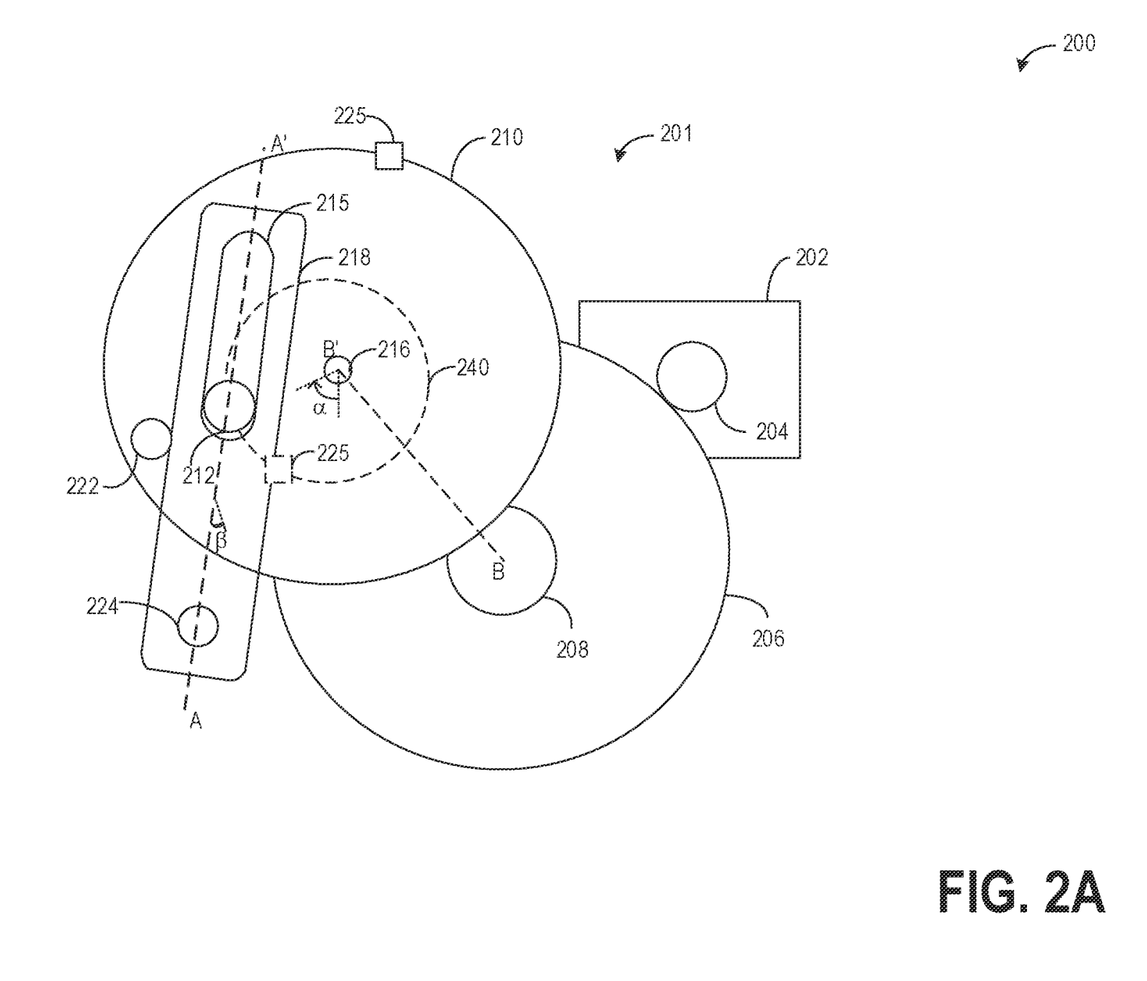
FIG. 2A shows a schematic of the electronic actuation system of FIG. 1 in a first state.
Figure 2B:
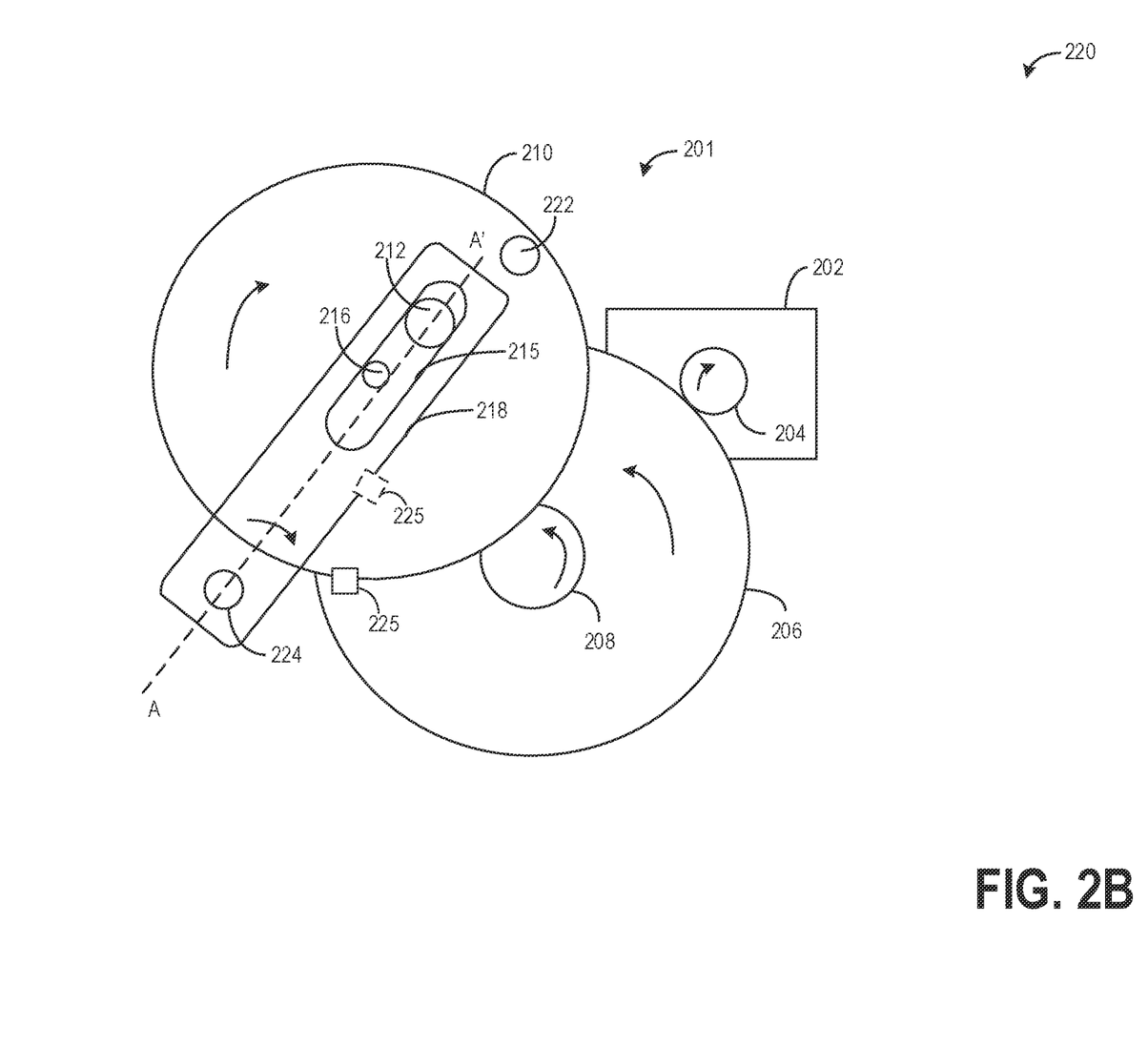
FIG. 2B shows a schematic of the electronic actuation system of FIG. 2A transitioning from the first state to a second state.
Figure 2C:
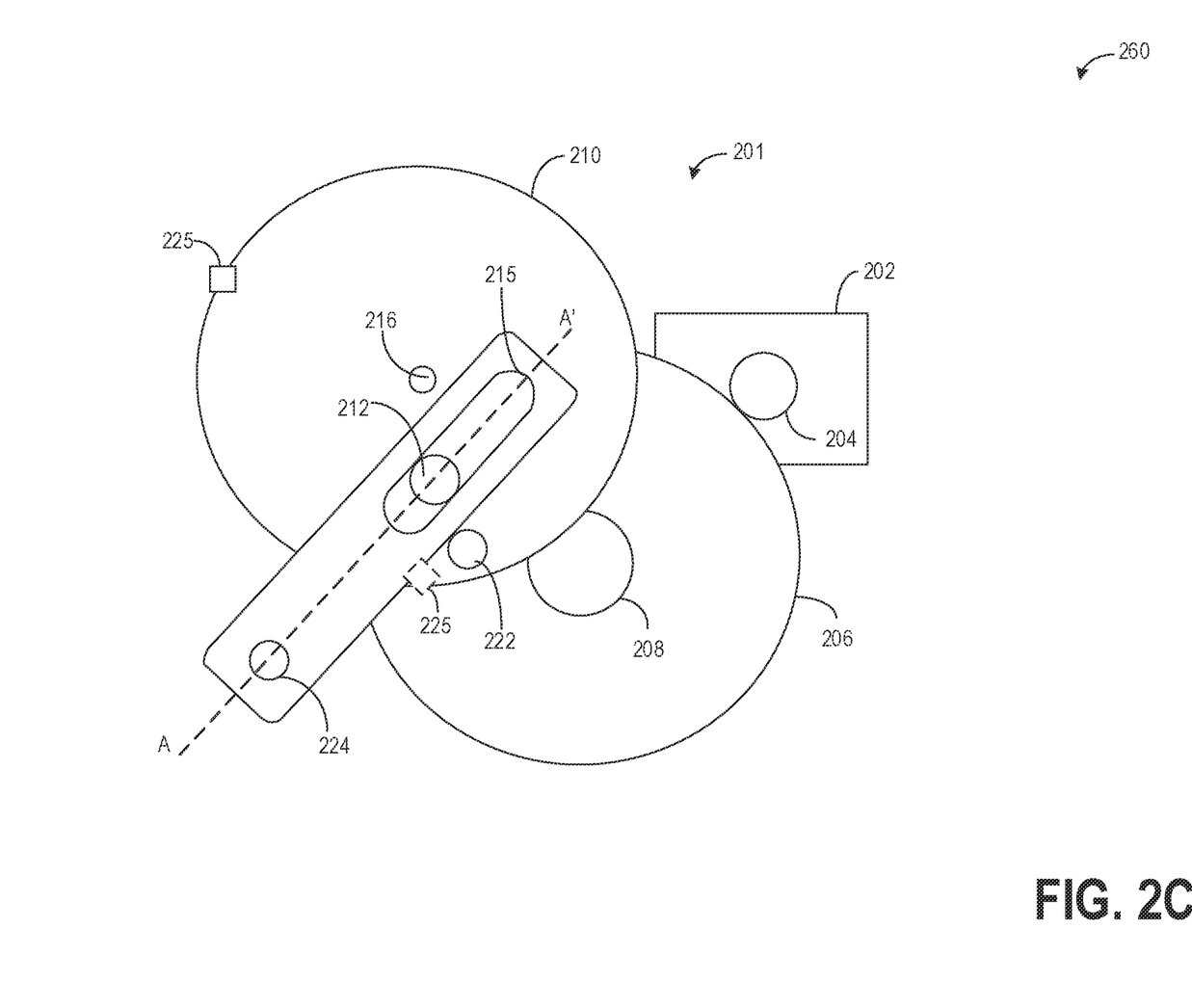
FIG. 2C shows a schematic of the electronic actuation system of FIG. 2A in the second state.
Figure 3A:
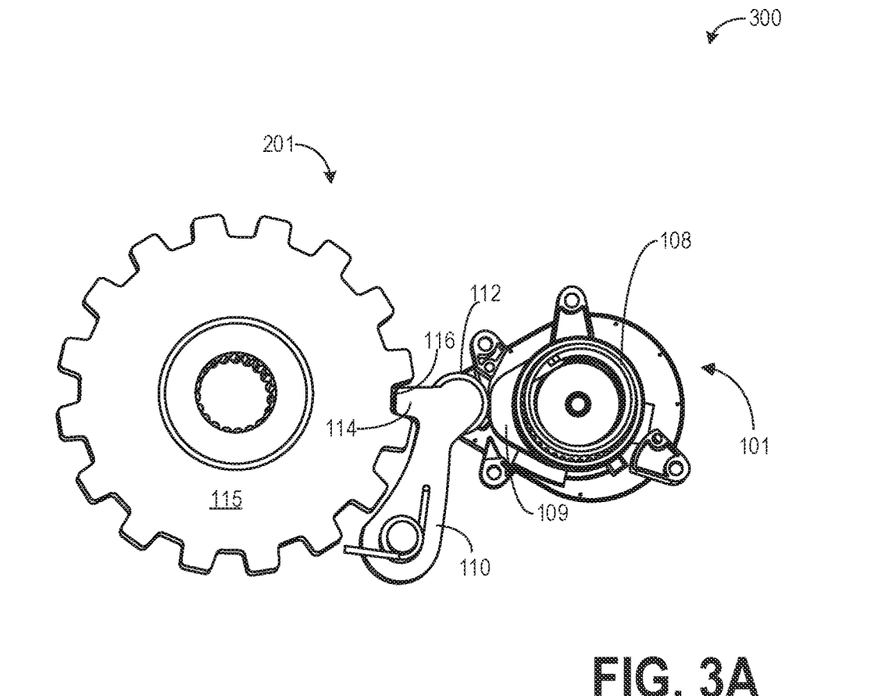
FIG. 3A shows a first position of the parking mechanism of the transmission system.
Figure 3B:
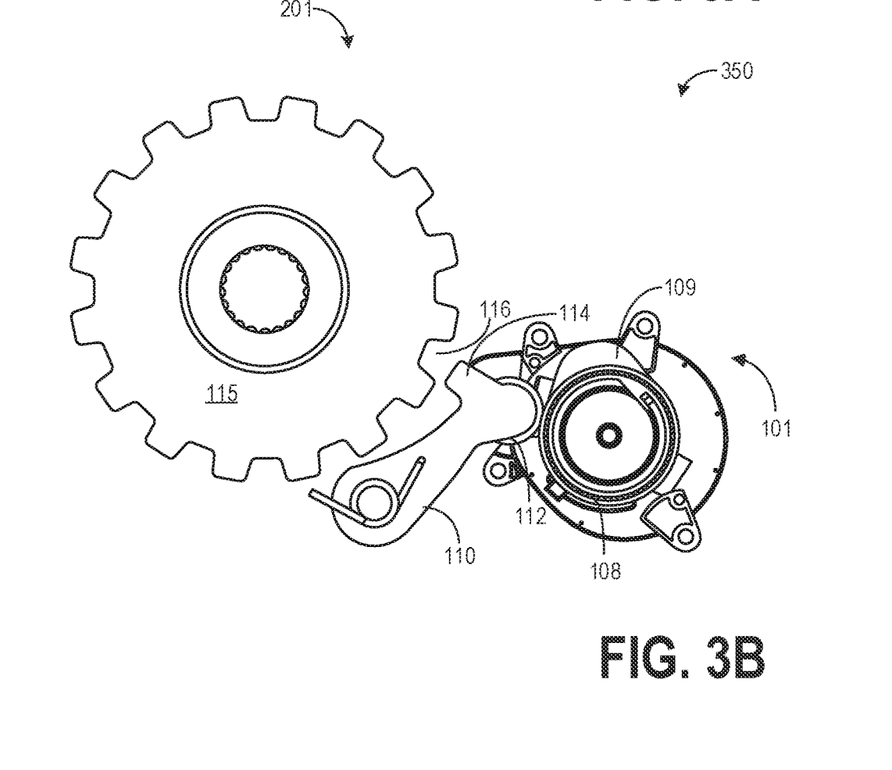
FIG. 3B shows a second position of the parking mechanism of the transmission system.

The following description relates to systems and methods for a non-back drivable electronic actuation system for a parking mechanism of a vehicle transmission system. The parking mechanism may be actuated between a first state and a second state via the electronic actuation system is schematically shown in FIG. 1. The first state of the parking mechanism, as shown in FIG. 3A, may correspond to a park mode of the transmission system, as selected by a user and the second state of the parking mechanism, as shown in FIG. 3B, may correspond to any mode of the transmission system expect the park mode. The electronic actuation system including a parallel axis gear train is shown in FIGS. 2A-C. The parking mechanism may be engaged corresponding to a first state of the electronic actuation system, as shown in FIG. 2A, or disengaged corresponding to a second state of the electronic actuation system, as shown in FIG. 2C. Transitioning of the electronic actuation system from the first state to the second state is shown in FIG. 2B. A vehicle controller may carry out a control routine, such as via the control routine of FIG. 4 to operate the electronic actuation system based on a mode of the transmission system as selected by the user.

FIG. 1 shows an example 100 of a parking mechanism 101 of a transmission system including an electronic actuation system 201. The parking mechanism 101 may include a parking gear 115 of the transmission system, the parking gear including alternating teeth 118 and ridges 116. The parking gear 115 may be coupled to an output shaft of the transmission system and may rotate with rotation of the output shaft.

A spring loaded pawl 110 may be positioned proximal to the parking gear and pivotally connected to a casing of the transmission system via the pivot 113. The pawl 110 may include an elongated portion ending in a protruded tooth 114. The pawl 110 may be moved upwards and downwards about the pivot 113. The end of the tooth 114 may be sized to occupy a ridge 116 between consecutive teeth 118 of the parking gear 115. The tooth 114 of the pawl 110 may include an arcuate upper surface and a roller 112 may be housed within the arcuate top portion of the pawl tooth 112. The roller 112 may be rotatable about its central axis, about the point 122.

The roller 112 may be in face sharing contact with a lobe of a cam 108. Rotation of the cam 108 may translate into rotation of the roller 112. The cam 108 may include a higher diameter surface 109 which may come into contact with the roller 112 upon rotation of the cam 108. The electronic actuation system 201 may be coupled to the cam via a shaft 104 and one or more flanges 106.

The electronic actuation system 201 may include the one or more parallel axis gears such as a first parallel axis gear, a second parallel axis gear, and a final parallel axis gear coupled to a first end of a lever arm 218 via an eccentric drive pin. An output shaft 224 may be coupled to a second end of the lever arm 218 distal from the first end. An actuator 202 such as an electric motor may be coupled to the first parallel axis gear to rotate the one or more parallel axis gears. The electronic actuation system 201 may be maintained in a first state or a second state. As an example, the lever arm 218 coupled to the actuator 202 via the parallel axis gear train may be rotated in a first direction until an output gear of the parallel axis gear train is driven past a tangent point and is non-back drivable from the first state of the actuation system. In another example, the level arm may be rotated in a second direction until the output gear is driven past the tangent point and is non-back drivable from a second state of the actuation system, the second direction opposite to the first direction. Details of the electronic actuation system 201 is described in relation to FIGS. 2A-2C.

In the first state of the electronic actuation system 201, as shown in example 300 in FIG. 3A, the parking mechanism 101 may be actuated to a first position corresponding to a park mode of the transmission system as selected by the user. In the first state, rotation of the output shaft 224 causes the cam 108 to rotate and the higher diameter surface 109 to come in contact with the roller 112. The higher diameter surface 109 of the cam 108 causes the roller 112 to push down the teeth 114 of the pawl 110 into a ridge 116 between two teeth 118 of the parking gear 115. By lodging the teeth 114 of the pawl 110 within the ridge 116, the parking gear 115 is locked in a position. Due to the parking gear 115 being locked (stopped from moving), the output shaft of the transmission system may no longer cause the vehicle wheels to rotate, thereby averting further motion of the wheels. In the second state of the electronic actuation system 201, as shown in example 350 in FIG. 3B, the parking mechanism may be actuated to a second position corresponding to a mode of the transmission system other than the park mode (such as drive, reverse, etc.) as selected by the user. In the second state, rotation of the output shaft 224 causes the cam 108 to rotate and a lower diameter surface to come in contact with the roller 112. In this position, the teeth 114 of the pawl 110 to remain separated from the parking gear such as not lodged within a ridge 116 of the parking gear. In this position, the pawl is not in contact with the parking gear 115, thereby allowing the parking gear 115 to rotate along with the transmission system as engine torque is transmitted to the vehicle wheels via the output shaft of the transmission system. In the second state, the vehicle wheels are free to rotate.

FIG. 2A-C show schematics of an electronic actuation system 201 for engaging/disengaging a parking mechanism (such as parking mechanism 101 in FIG. 1) of a vehicle transmission system. The electronic actuation system 201 may include a first parallel axis gear 206 coupled to a motor/pinion gear 204 of a drive motor 202. The drive motor (actuator) 202 may be an electric motor such as a brushless motor, shunt motor, stepper motor, and other types of electric motors. The drive motor 202 may be selectively operated to rotate the motor/pinion gear 204 in a clockwise (first) and an anticlockwise (second) direction.

The first parallel axis gear 206 may include a second attached parallel axis gear 208 fixed to the center of the first parallel axis gear 206. The second parallel axis gear 208 may rotate at the same speed and in the same direction as the first parallel axis gear 206. The second parallel axis gear 208 may provide an interface between the first parallel axis gear 206 and an adjacent final parallel axis gear 210. The second parallel axis gear 208 may be in face sharing contact with a perimeter of the final parallel axis gear 210. In one example, the second parallel axis gear 208 and the perimeter of the final parallel axis gear 210 may include complementary geometries such as teeth and groves that allow effective coupling of the first parallel axis gear 206 and the final parallel axis gear 210 via the second parallel axis gear 208.

Each of the first parallel axis gear 206 and the final parallel axis gear 210 may be configured to rotate in both clockwise and anticlockwise directions along their respective central axes. The central axis of the first parallel axis gear 206 may pass through the center of the second parallel axis gear 208.

A lever arm 218 may be coupled to the final parallel axis gear 210 via a drive pin 212 fixed to and eccentric to the final parallel axis gear 210. The lever arm 218 may include an elongated slot 215 proximal to its first end. In one example, a rolling element may be mounted on the drive pin 212 and the rolling element may be positioned within the slot 215 of the lever arm 218, thereby coupling the lever arm 218 to the final parallel axis gear 210 via the drive pin 212. The slot 215 may be elongated along the longitudinal A-A' axis of the lever arm 218 with rounded ends complementary to the radius of the drive pin 212 housed there within. The longitudinal A-A' axis of the lever arm 218 may make an angle to an axis B-B' connecting a center of the first parallel axis gear 206 to the center of the final parallel axis gear 210.

The drive pin 212 may move along a length of slot 215 as the final parallel axis gear 210 rotates about the center 216 of the final parallel axis gear 210. The lever arm is free to rotate about drive pin 212. During rotation of the final parallel axis gear 210, the drive pin 212 may not align with the center 216 of the final parallel axis gear 210 and the drive pin 212 may be off-centered relative to the center 216 of the final axis gear 210.

A locking pin 222 may be coupled to the final parallel axis gear 210, off-centered, towards the perimeter of the final parallel axis gear 210. The locking pin 222 may protrude outward from and may be perpendicular to the plane of the final parallel axis gear 210 and rotate along with the final parallel axis gear 210. In this embodiment, the locking pin 222 is shown as a pin protruding out of the final parallel axis gear 210, however, in other embodiments, the locking pin 222 may be replaced by any form of obstruction such as a bump at the position of the locking pin 222 on the final parallel axis gear 210, or a tooth sticking out at the position of the locking pin 222 on the final parallel axis gear 210.

During rotation of the final parallel axis gear 210 and the lever arm 218, the locking pin 222 may provide an obstruction hindering further movement of the lever arm 218. Rotational degrees of freedom of the lever arm 218 may be lower than the rotational freedom of each of the first parallel axis gear 206 and the final parallel axis gear 210. An angle of rotation of the parallel axis gear is shown by a and the corresponding angle of rotation of the lever arm is shown by β in FIG. 2A. The rotational freedom of the lever arm 218 may be limited by the locking pin 222. The lever arm 218 may be locked at one of a first position corresponding to a first position of the locking pin 222 and at a second position corresponding to a second position of the locking pin 222. As such, once the lever arm 218 is rotated, in a clockwise/counter-clockwise direction, beyond a point (refereed herein as tangent point) where the drive pin 212 travel is tangent to the axis A-A' of the lever arm 218, any further force on the lever arm 218 may be self-locking, causing the lever arm to be locked in contact with the locking pin 222. At the tangent point, rotation of the final parallel axis gear 210 may not translate to any movement of the lever arm 218. A trajectory of the tangent point is shown in FIG. 2A by dashed line 240.

An output shaft 224 may be coupled to a second end of the lever arm 218, the second end distal from the first end and the slot 215. The output shaft 224 may be perpendicular to the plane of the lever arm 218. The shaft may be coupled to a pawl of a transmission system via a cam. When the lever arm 218 is locked in the first position, the electronic actuation system 201 may be in a first state, and the output shaft 224 may actuate the pawl to engage with a parking gear of the transmission system corresponding to a first, engaged position of the parking mechanism. In the first, engaged position of the parking mechanism, the transmission system is on a park mode and the vehicle wheels may not be rotated. When the lever arm 218 is locked in the second position, the electronic actuation system 201 may be in a first state, and the output shaft 224 may actuate the pawl to disengage from the parking gear of the transmission system corresponding to a second, disengaged position of the parking mechanism. In the second, disengaged position of the parking mechanism, the transmission system is not on a park mode and the vehicle wheels may be rotated.

A position sensor may be coupled to one or more components of the electronic actuation system 201. In this example, a position sensor 225 may be coupled to the final parallel axis gear 210 or the lever arm 218. During transition of the electronic actuation system 201 from a first position to a second position, the position sensor 225 may determine the current position such as a distance of the lever arm, 218 from the locking pin 222. The sensor 225 may be one of an inductive sensor and a Hall Effect sensor.

FIG. 2A shows an example schematic 200 of the electronic actuation system 201 in a first state. In the first state, the lever arm 218 is locked in a first, position with the left edge of the lever arm 218 in contact with the locking pin 222. In order to reach the first, locked, position, of the lever arm 218, the final parallel axis gear 210 may be rotated counterclockwise past the tangent point where the drive pin 212 travel is tangent to the axis A-A' of the lever arm 218. Due to the rotation of the final parallel axis gear 210 beyond the tangent point, a clockwise torque on the lever arm 218 may result in a counterclockwise torque on the final parallel axis gear 210.

The presence of the locking pin 222 inhibits further clockwise movement (towards left) of the lever arm 218. Once the lever arm 218 crosses the tangent point, even if an external force is applied to rotate the lever arm 218 in the counter-clockwise direction (towards right), the force generated in the direction to back drive the lever arm 218 may not be sufficient to rotate the lever arm 218 past the tangent point. In this way, the lever arm 218 may be locked in a first position causing the actuation system and the attached parking mechanism to be non-back drivable.

In response to the output shaft 224 being in the first position, a teeth of a pawl of the transmission system may be inserted in a ridge between teeth of a parking gear, thereby causing the parking gear and the output shaft of the transmission system to stop rotating. Since the electronic actuation system 201 is non-back drivable, the parking gear may remain stationary until the motor/pinion gear 204 of a drive motor 202 is actuated by the controller. In this way, when the vehicle is parked at a slope and the parking mechanism is engaged, the non-back drivable electronic actuation system 201 may provide stability to the vehicle and inhibit undesired movement of the wheels. An operator/user may select a park mode of the transmission system via an instrument panel in the vehicle.

FIG. 2C shows an example schematic 260 of the electronic actuation system 201 in a second state. In the second state, the lever arm 218 is locked in a second, position with the right edge of the lever arm 218 in contact with the locking pin 222. In order to reach the second, locked, position, of the lever arm 218, the final parallel axis gear 210 may be rotated clockwise past the tangent point where the drive pin 212 travel is tangent to the axis A-A' of the lever arm 218.

The presence of the locking pin 222 inhibits further counter-clockwise movement (towards right) of the lever arm 218. Once the lever arm 218 crosses the tangent point, even if an external force is applied to rotate the lever arm 218 in the clockwise direction (towards left), the force generated in the direction to back drive the lever arm 218 may not be sufficient to rotate the lever arm 218 past the tangent point. In this way, the lever arm 218 may be locked in a second position causing the actuation system and the attached parking mechanism to be non-back drivable.

In response to the output shaft 224 being in the second position, the teeth of the pawl of the transmission system may be disengaged from the parking gear, thereby causing the parking gear and the output shaft of the transmission system to be able to rotate. Since the electronic actuation system 201 is non-back drivable, the pawl may remain disengaged until the motor/pinion gear 204 of a drive motor 202 is actuated by the controller. In this way, when the vehicle is operating and the transmission system is not in the park mode, the non-back drivable electronic actuation system 201 may inhibit undesired stopping of the wheels. An operator may disengage the parking mechanism from an engaged position by selecting a mode of the transmission system other than park via an instrument panel in the vehicle.

FIG. 2B shows an example schematic 220 of the electronic actuation system 201 transitioning from the first state (as shown in FIG. 2A) to the second state (as shown in FIG. 2C). In the first state of the electronic actuation system 201, the lever arm 218 may be locked in a first position and a parking mechanism may be engaged. In the second state of the electronic actuation system 201, the lever arm 218 may be locked in a second position and a parking mechanism may be disengaged. Engagement and disengagement of the parking mechanism may be initiated by the vehicle operator by selecting a mode of operation of the transmission system such as park, drive, reverse etc. via an on-board instrument panel. The motor/pinion gear 204 and the parallel axis gear train may remain stationary when the electronic actuation system 201 is either in the first state or the second state, and the motor/pinion gear 204 and the parallel axis gear train may only rotate during the transition of the electronic actuation system 201 from one state to another.

In response to a command from the operator to disengage the parking mechanism such as upon shifting the transmission system from park to drive, the electronic actuation system 201 may be transitioned from the first state to the second state. The motor/pinion gear 204 of the drive motor 202 may be rotated in a clockwise direction causing each of the first parallel axis gear 206 and the second parallel axis gear 208 to rotate in counter-clockwise directions about their respective axes. The final parallel axis gear 210 may then rotate clockwise about its center 216. Rotation of the final parallel axis gear 210 may cause the drive pin mounted on the final parallel axis gear 210 to rotate and slide within the slot 215 in the lever arm 218. The final parallel axis gear 210 may be rotated clockwise past the tangent point where the drive pin 212 travel is tangent to the axis A-A' of the lever arm 218 causing the lever arm 218 to be rotated in the counter-clockwise direction until it meets the locking pin 222. Once the lever arm 218 is in contact with the locking pin 222, the lever arm 218 may be locked in the second position.

During transition of the electronic actuation system 201 from the first state to the second state, a position of the parallel axis drive train may be monitored via the sensor 225. If it is determined that after a threshold duration has elapsed since the transition of the electronic actuation system 201 to the second state and yet the second state has not been reached, it may be inferred that the parallel axis train is stuck in between the first state and the second state, and a diagnostics code may be set indicating degradation of the electronic actuation system 201. In this way, diagnostics of the electronic actuation system 201 may be carried out during transition of the system from one non-back drivable state to another.

Figure 4:
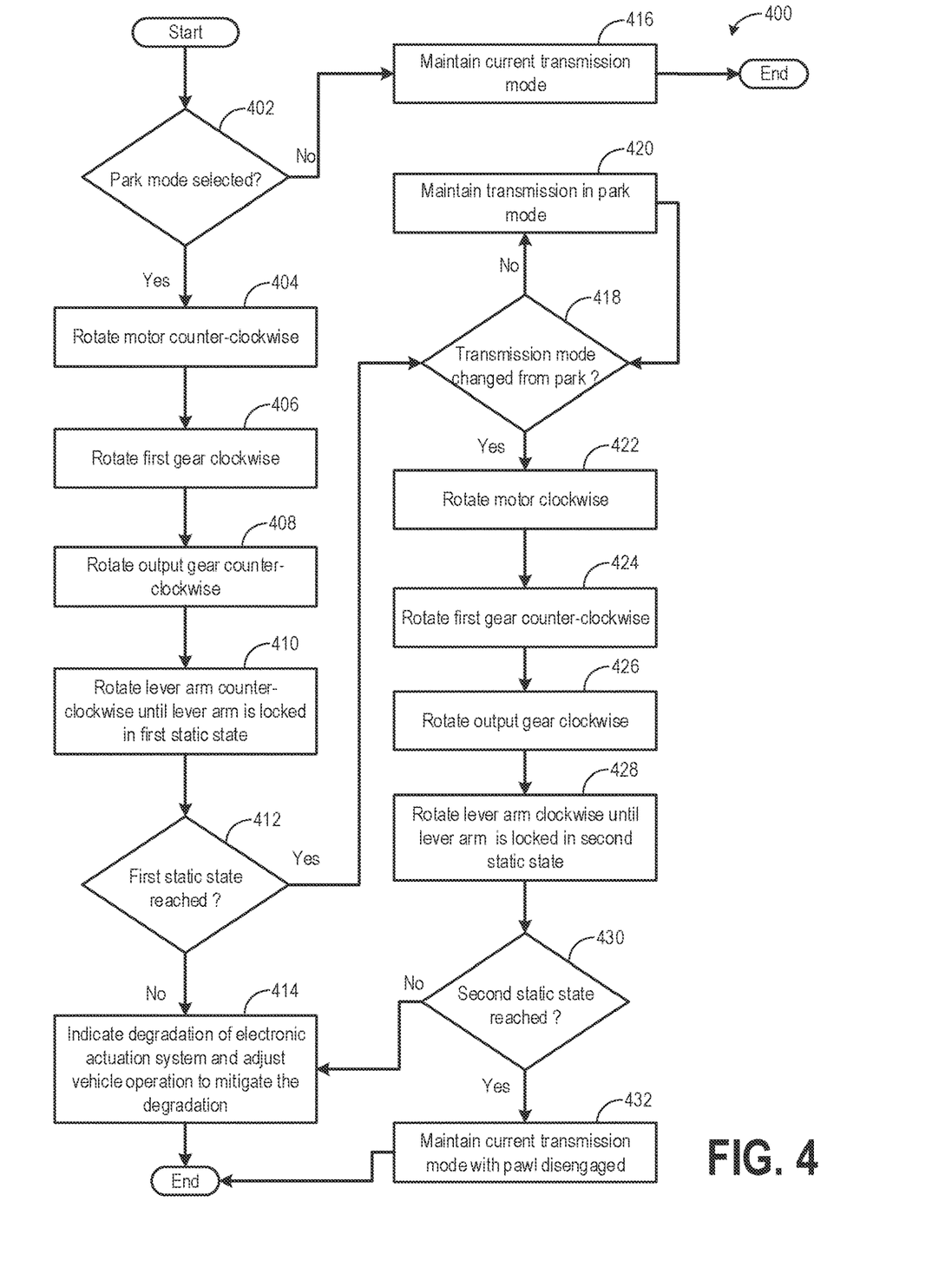
FIG. 4 shows a flow-chart illustrating an example method for operating the electronic actuation system of the parking mechanism.

FIG. 4 shows an example method 400 for operating an electronic actuation system (such as electronic actuation system 201 in FIGS. 2A-2C) of a parking mechanism (such as parking mechanism 101 in FIG. 1) of a vehicle transmission system. The parking mechanism may be actuated to engage a pawl with a parking gear which would inhibit the vehicle wheels from rolling, and disengage the pawl from the parking gear which would allow movement of the vehicle wheels. Instructions for carrying out method 400 and the rest of the methods included herein may be executed by a controller based on instructions stored on a memory of the controller and in conjunction with signals received from sensors of the vehicle system. The controller may employ engine actuators of the vehicle system to adjust engine operation, according to the methods described below.

At 402, the routine includes determining if a park mode of the transmission system has been selected. A vehicle operator may select a mode of operation of the transmission system such as park via an onboard instrument panel. When the park mode is selected, the controller may actuate the parking mechanism to a first position to engage the pawl of the transmission system with the parking gear to inhibit further motion of the output shaft of the transmission system and the wheels.

If it is determined that park mode of the transmission system is not selected, at 416, the transmission system may be maintained in the current mode. As an example, the parking mechanism may be continued in a second position where the pawl is not engaged with the parking gear and the output shaft of the transmission system and the wheels are able to rotate.

If it is determined that the park mode is selected, at 404, a motor/pinion gear (such as motor/pinion gear 204 in FIGS. 2A-C) of a drive motor (such as drive motor 202 in FIGS. 2A-C) of the electronic actuation system may be rotated in a counter-clockwise direction. The controller may send a signal to the actuator of the motor/pinion gear to rotate the motor/pinion gear in the counter-clockwise direction.

At 406, counter-clockwise rotation of the motor/pinion gear may cause the first gear (such as first parallel axis gear 206 in FIGS. 2A-C) of the parallel axis gear train meshed with the motor/pinion gear to rotate clockwise. Rotation of the first gear may also cause a second gear (such as second parallel axis gear 208 in FIGS. 2A-C) mounted at the center of the first gear to rotate in the clockwise direction.

At 408, an output gear (such as final parallel axis gear 210 in FIGS. 2A-C) of the electronic actuation system meshed with the second gear may rotate in a counter-clockwise direction about its axis. Rotation of the output gear may cause the lever arm fixed to and eccentric to the final gear via a drive pin (such as drive pin 212 in FIG. 2A-C) to rotate. As the final gear rotates, the lever arm may rotate and slide along the slot housing the drive pin. At 410, the lever arm may be rotated counter-clockwise until the lever arm is locked in a first static position. In order to reach the first static position, the final gear may be rotated in a counter-clockwise direction past a tangent point where the direction of travel of the drive pin is tangent to the axis of the lever arm until the lever arm is contacting a locking pin (such as locking pin 222 in FIG. 222). Upon reaching the first, static position, the lever arm is non-back drivable even if external torque is applied on the lever arm. At the first static state of the lever arm, an output shaft coupled to the lever arm may actuate a cam to rotate and push down the pawl to engage with a groove of the parking gear. Once a teeth of the pawl is lodged in a groove of the parking gear, the parking gear is stationary causing rotation of the output shaft of the transmission system and the vehicle wheels to stop moving.

At 412, the routine includes determining if a first static state of the lever arm has been reached within a first threshold time from the selection of the parking mode (step 402). The first threshold time may be pre-calibrated based on a time taken for the lever arm to travel from a second static state (corresponding to a disengaged parking gear) to the first static state upon actuation of the motor. The position of the parallel axis gear train including the position of the lever arm may be monitored by a sensor (such as a position sensor 225 in FIGS. 2A-C) coupled to either the final gear or the lever arm.

If it is determined that the first static state of the lever arm has not been reached within the first threshold time from the from the selection of the parking mode, it may be inferred that the electronic actuation mechanism is stuck such as one or more gears of the parallel axis gear train is stuck in an intermediate position while transitioning from the second to the first state. As such, the electronic actuation system may not rest at any intermediate position between the first and second states and may only be locked in one of the first and the second state. At 414, degradation of the electronic actuation system may be indicated by setting a flag (diagnostic code) and displaying a message in the vehicle dashboard. In response to degradation of the electronic actuation system of the parking mechanism, vehicle operations may be adjusted to mitigate the degradation. In one example, a backup electronic parking brake may be applied to inhibit movement of the wheels when the transmission system is desired to be operated in a park mode.

If at 412, it is determined that the first static state of the lever arm has been reached within the first threshold time from the selection of the parking mode, it may be inferred that the pawl has been engaged with the parking gear and will be maintained in the engaged position until a different mode (other than park) of the transmission system is selected.

At 418, the routine includes determining if the transmission system mode is changed from park to any other transmission system mode such as drive, reverse, etc. by the operator via the onboard instrument panel. When the transmission system mode is changed from the park mode, the controller may actuate the parking mechanism to a second position to disengage the pawl of the transmission system from the parking gear to enable motion of the output shaft of the transmission system and the wheels.

If it is determined that a change in transmission mode from park has not being indicated, at 420, the transmission system mode is maintained in the park mode. As an example, the parking mechanism may be continued in a first position where the pawl is engaged with the parking gear and the output shaft of the transmission system and the wheels are unable to rotate.

If the transmission system mode is changed, at 422, the motor/pinion gear of the drive motor of the electronic actuation system may be rotated in a clockwise direction. The controller may send a signal to the actuator of the motor/pinion gear to rotate the motor/pinion gear in the clockwise direction.

At 424, clockwise rotation of the motor/pinion gear may cause the first gear of the parallel axis gear train meshed with the motor/pinion gear to rotate counter-clockwise. Rotation of the first gear may also cause the second gear mounted at the center of the first gear to also rotate in the counter-clockwise direction.

At 426, the output gear of the electronic actuation system meshed with the second gear may rotate in a clockwise direction about its axis. Rotation of the output gear may cause the lever arm fixed to and eccentric to the final gear via a drive pin to rotate. As the final gear rotates, the lever arm may rotate and slide along the slot housing the drive pin. At 428, the lever arm may be rotated clockwise until the lever arm is locked in a second static position. In order to reach the second static position, the final gear may be rotated in a clockwise direction past a tangent point where the direction of travel of the drive pin is tangent to the axis of the lever arm until the lever arm is contacting the locking pin. Upon reaching the second, static position, the lever arm is non-back drivable even if external torque is applied on the lever arm. At the second static state of the lever arm, an output shaft coupled to the lever arm may actuate a cam to rotate and release the pawl from engagement with a groove of the parking gear. Once a teeth of the pawl is dislodged from the groove of the parking gear, the parking gear is able to rotate causing the output shaft of the transmission system and the vehicle wheels to rotate.

At 430, the routine includes determining if a second static state of the lever arm has been reached within a second threshold time from the change in transmission mode (step 418). The second threshold time may be pre-calibrated based on a time taken for the lever arm to travel from a first static state to the second static state. In one example, the first threshold time and the second threshold time may be equal. In one example, the first threshold time and the second threshold time may be unequal. The position of the parallel axis gear train including the position of the lever arm may be monitored by the position sensor coupled to either the final gear or the lever arm.

If it is determined that the second static state of the lever arm has not been reached within the second threshold time from the change in transmission mode, it may be inferred that the electronic actuation mechanism is stuck such as one or more gears of the parallel axis gear train is stuck in an intermediate position while transitioning from the first to the second state and the routine may proceed to step 414 to indicate degradation of the electronic actuation system. If it is determined that the second static state of the lever arm has not been reached within the second threshold time from the change in transmission mode, at 432, the transmission system may be maintained in its current mode with the pawl disengaged from the parking gear until further change in the transmission system.

In this way, during a first condition, a level arm coupled to a motor via a parallel axis gear train may be rotated in a first direction until an output gear of the parallel axis gear train is driven past a tangent point and is non-back drivable from a first state of the actuation system, and during a second condition, the level arm coupled to the motor via the parallel axis gear train may be rotated in a second direction until the output gear is driven past the tangent point and is non-back drivable from a second state of the actuation system, the second direction opposite to the first direction. The first condition may include a park mode of the transmission system being selected hindering movement of wheels of the vehicle, and the second condition may include another mode of the transmission system different from the park mode being selected allowing movement of the wheels.

In one example, a actuation system in a parking mechanism of a vehicle, comprising: an actuator coupled to a lever arm via one or more gears, and an output shaft connecting the lever arm to a shifting member of the parking mechanism, the lever arm non-back drivable at each of a first state and a second state of the actuation system. In the preceding example, additionally or optionally, the first state of the actuation system corresponds to a pawl of a transmission system to be engaged to a parking gear hindering movement of wheels of the vehicle, and wherein the second state of the actuation system corresponds to the pawl being disengaged from the parking gear allowing movement of the wheels. In any or all of the preceding examples, additionally or optionally, the pawl is engaged to the parking gear upon selection of a park mode of the transmission system by an operator of the vehicle via an instrument panel in the vehicle, and wherein the pawl is disengaged from the parking gear upon selection of a mode transmission system different from the park mode by the operator via the instrument panel. In any or all of the preceding examples, additionally or optionally, the one or more gears include a first parallel axis gear, a second parallel axis gear, and a final parallel axis gear coupled to a first end of the lever arm via an eccentric drive pin. In any or all of the preceding examples, the system further comprising, additionally or optionally, a locking pin coupled to the final parallel axis gear in face sharing contact with a lever arm at each of the first state and the second state of the actuation system, the lever arm driven via the eccentric drive pin housed within a slot in the lever arm. In any or all of the preceding examples, additionally or optionally, the actuator is an electric motor coupled to the first parallel axis gear. In any or all of the preceding examples, additionally or optionally, the first parallel axis gear is coupled to the final parallel axis gear via the second parallel axis gear and wherein the second parallel axis gear is fixed to a center of the first parallel axis gear, the second parallel axis gear in face sharing contact with a perimeter of the final parallel axis gear. In any or all of the preceding examples, additionally or optionally, each of the first parallel axis gear, the final parallel axis gear, and the lever arm are coplanar with a longitudinal axis of the lever arm making an angle to an axis connecting a center of the first parallel axis gear to the center of the final parallel axis gear and wherein the shaft is coupled to a second end of the lever arm, the first end distal from the second end, the shaft perpendicular to a plane of the lever arm. In any or all of the preceding examples, additionally or optionally, the shifting member of the parking mechanism is the pawl, the output shaft coupled to the pawl via a cam and a roller. In any or all of the preceding examples, additionally or optionally, in the first state of the actuation system, the cam pushes down the pawl via the roller to engage the pawl within a grove of the parking gear, and wherein the second state of the actuation system, the pawl is released from the grove of the parking gear. In any or all of the preceding examples, additionally or optionally, the actuator rotating in a first direction rotates the first parallel axis gear in a second direction and the final parallel axis gear in the first direction past a tangent point until the lever arm is in face sharing contact with the locking pin locking the actuation system in the first state and wherein the actuator rotating in the second direction rotates the first parallel axis gear in the first direction and the final parallel axis gear in the second direction past the tangent point until the lever arm is in face sharing contact with the locking pin locking the actuation system in the second state, the first direction opposite to the second direction.

In another example, a method for an actuation system, comprises: during a first condition, rotating a level arm coupled to a motor via a parallel axis gear train in a first direction until an output gear of the parallel axis gear train is driven past a tangent point and is non-back drivable from a first state of the actuation system, and during a second condition, rotating the level arm coupled to the motor via the parallel axis gear train in a second direction until the output gear is driven past the tangent point and is non-back drivable from a second state of the actuation system, the second direction opposite to the first direction. In the preceding example, additionally or optionally, the lever arm is coupled to the output gear of the parallel axis gear train via a drive pin housed within a slot in the lever arm, and at the tangent point, a direction of travel of the drive pin is tangential to a longitudinal axis of the lever arm, and wherein the lever arm is further coupled to a pawl of a transmission system of a vehicle via a cam. In any or all of the preceding examples, additionally or optionally, the first condition includes a park mode of the transmission system being selected hindering movement of wheels of the vehicle and the second condition includes another mode of the transmission system different from the park mode being selected allowing movement of the wheels. In any or all of the preceding examples, additionally or optionally, when the park mode is selected, the pawl engages with a parking gear of the transmission system suspending movement of the parking gear. In any or all of the preceding examples, additionally or optionally, the actuation mechanism transitions from the first state to the second state upon change in the transmission mode from the park mode to another mode and wherein the actuation mechanism transitions from the second state to the first state upon selection of the park mode. In any or all of the preceding examples, the method further comprising, additionally or optionally, during transitioning from the second state to the first state, estimating a position of the parallel axis gear train via a position sensor coupled to the parallel axis gear train, and in response to the first state not being reached within a first threshold duration, indicating degradation of the actuation system, and during transitioning from the first state to the second state, estimating the position of the parallel axis gear train via the position sensor, and in response to the second state not being reached within a second threshold duration, indicating degradation of the actuation system.

In yet another example, method for a transmission system of a vehicle, comprises: rotating a parallel axis gear coupled to a lever arm through a drive pin in a slot of the lever arm, the drive pin fixed to the parallel axis gear, to rotate the lever arm, and engaging and disengaging a pawl of the transmission system by the rotation of the lever arm between two fixed end positions, rotational degrees of the lever arm substantially less than rotational degrees of the parallel axis gear. In the preceding example, additionally or optionally, upon selection of a park mode of the transmission system, the lever arm is rotated counter-clockwise from a second end position until a first end position is reached, the first end position corresponding to the pawl being engaged. In any or all of the preceding examples, additionally or optionally, upon indication of selection of another mode of the transmission system different from the park mode, the lever arm is rotated clockwise from the first end position until the second end position is reached, the second end position corresponding to the pawl being disengaged.

FIGS. 1-2A, B, C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a transmission of a vehicle, comprising:
an actuator coupled to a lever arm via a plurality of gears;
an output shaft connecting the lever arm to a shifting member of a parking mechanism;
a first gear of the plurality of gears;
a second gear of the plurality of gears;
a drive pin positioned eccentrically on the second gear and the lever arm engaging with the drive pin; and
a locking pin positioned on the second gear, wherein the locking pin is configured to engage the lever arm and prevent rotation of the second gear at a first rotational position and a second rotational position of the second gear.

2. The system of claim 1, wherein the first rotational position corresponds to a pawl of a transmission system engaged to a parking gear, and the second rotational position corresponds to the pawl being disengaged from the parking gear.

3. The system of claim 1, wherein a third gear of the plurality of gears is positioned on the first gear and the third gear is engaged with the second gear, and
the first gear, the second gear, and the third gear are in a parallel axis arrangement.

4. The system of claim 1, wherein the lever arm is driven via the drive pin engaged with the lever arm.

5. The system of claim 1, wherein the first gear is coupled to the second gear via a third gear, the third gear is fixed to a center of the first gear, and the third gear is engaged with a perimeter of the second gear.

6. The system of claim 1, wherein the lever arm and the second gear are coplanar and the lever arm rotates around a face of the second gear.

7. The system of claim 1, wherein the lever arm is connected to a cam,
in the first rotational position, the cam pushes a parking pawl into engagement with a parking gear, and
in the second rotational position the cam rotates and creating space for the parking pawl to disengage from the parking gear.

8. A method a transmission of a vehicle, comprising:
rotating a lever arm in a first direction via a drive pin eccentrically positioned on a gear until a locking pin positioned on the gear engages the lever arm;
rotating the lever arm in a second direction via the drive pin until the locking pin engages the lever arm; and
rotating an output shaft via rotation of the lever arm.

9. The method of claim 8, wherein the drive pin moves within a slot within the lever arm.

10. The method of claim 8, wherein when the locking pin engages a first side of the lever arm, a parking pawl connected to the output shaft is in engagement with a parking gear.

11. The method of claim 8, wherein the locking pin engages with a first side of the lever arm when the lever arm rotates in the first direction and the locking pin engages with a second side of the lever arm when the lever arm rotates in the second direction.

12. The method of claim 8, wherein when the locking pin engages a second side of the lever arm, a parking pawl connected to the output shaft is disengaged from a parking gear.

13. The method of claim 8, further comprising, estimating a position of the gear via a position sensor, and
in response to the locking pin not engaging with the first side of the lever arm within a first threshold, indicating degradation, and
in response to the locking pin not engaging with the first side of the lever arm within a second threshold, indicating degradation.

14. A method for a transmission of a vehicle, comprising:
rotating a lever arm, a slot of the lever arm receiving a drive pin, the drive pin positioned eccentrically on a face of a gear;
engaging the lever arm with a locking pin at two rotational positions of the gear, the locking pin coupled to the gear; and engaging and disengaging a parking pawl from a parking gear via rotation of the lever arm.

15. The method of claim 14, wherein upon selection of a park mode, the gear and the lever arm are rotated in a first rotational direction from a second rotational position until a first rotational position is reached, the first rotational position corresponding to the parking pawl being engaged.

16. The method of claim 15, wherein upon indication of selection of another mode of the transmission system different from the park mode, the lever arm is rotated in a second rotational direction from the first rotational position until the second rotational position is reached, the second rotational position corresponding to the parking pawl being disengaged.

17. The method of claim 14, wherein during rotation between the two rotational positions, the drive pin between moves from a first end of the slot of the lever arm to a second end opposite the first end and back towards the first end.

18. The method of claim 14, wherein at each of the two rotational positions where the locking pin engages the lever arm, the locking pin prevents travel of the lever arm in one direction of the lever arm and an actuation system prevents travel of the lever arm in an opposite direction of the lever arm.

* * * * *